United States Patent
Gubler et al.

(10) Patent No.: US 11,611,084 B2
(45) Date of Patent: Mar. 21, 2023

(54) BILAYER ELECTROLYTE MEMBRANE AND A REDOX FLOW BATTERY COMPRISING A BILAYER ELECTROLYTE MEMBRANE

(71) Applicant: PAUL SCHERRER INSTITUT, Villigen Psi (CH)

(72) Inventors: Lorenz Gubler, Untersiggenthal (CH); Fabio J. Oldenburg, Windisch (CH); Alexander Arndt, Berlin (DE)

(73) Assignee: Paul Scherrer Institut, Villigen (CH)

( * ) Notice: Subject to any disclaimer, the term of this patent is extended or adjusted under 35 U.S.C. 154(b) by 161 days.

(21) Appl. No.: 16/962,392

(22) PCT Filed: Dec. 5, 2018

(86) PCT No.: PCT/EP2018/083578
§ 371 (c)(1),
(2) Date: Jul. 15, 2020

(87) PCT Pub. No.: WO2019/137696
PCT Pub. Date: Jul. 18, 2019

(65) Prior Publication Data
US 2021/0075030 A1   Mar. 11, 2021

(30) Foreign Application Priority Data

Jan. 15, 2018 (EP) .................. 18151702
Oct. 11, 2018 (EP) .................. 18199911

(51) Int. Cl.
*H01M 8/0228* (2016.01)
*H01M 8/1023* (2016.01)
(Continued)

(52) U.S. Cl.
CPC ....... *H01M 8/0228* (2013.01); *H01M 8/1023* (2013.01); *H01M 8/1055* (2013.01); *H01M 8/1093* (2013.01); *H01M 8/188* (2013.01)

(58) Field of Classification Search
CPC ............. H01M 8/0228; H01M 8/1023; H01M 8/1055; H01M 8/1093; H01M 8/188
See application file for complete search history.

(56) References Cited

U.S. PATENT DOCUMENTS

2011/0081594 A1* 4/2011 Han .................... H01M 50/489
429/479
2012/0028086 A1   2/2012 Shi et al.
(Continued)

*Primary Examiner* — James Lee
(74) *Attorney, Agent, or Firm* — Laurence A. Greenberg; Ralph E. Locher; Werner H. Stemer

(57) ABSTRACT

An electrolyte membrane and method for generating the membrane provide a resistance as low as possible to minimize ohmic losses. The membrane has a low permeability for redox-active species. If redox-active species still cross the membrane, this transport is balanced during charge and discharge preventing a net vanadium flux and associated capacity fading. The membrane is mechanically robust, chemically stable in electrolyte solution, and low cost. A family of ion exchange membranes including a bilayer architecture achieves these requirements. The bilayer membrane includes two polymers, i) a polymer including N-heterocycles with electron lone pairs acting as proton acceptor sites and ii) a mechanically robust polymer acting as a support, which can be a dense cation exchange membrane or porous support layer. This bilayer architecture permits a very thin polymer film on a supporting polymer to minimize ohmic resistance and tune electrolyte transport properties of the membrane.

19 Claims, 8 Drawing Sheets

(51) Int. Cl.
*H01M 8/1041* (2016.01)
*H01M 8/1086* (2016.01)
*H01M 8/18* (2006.01)

(56) References Cited

U.S. PATENT DOCUMENTS

2012/0177976 A1 7/2012 Wensley et al.
2017/0179514 A1 6/2017 Bae et al.

\* cited by examiner

FIG. 1

| | Example 1 | Example 2 | Comparative Example 1 | Comparative Example 2 |
|---|---|---|---|---|
| PBI thickness (μm) | 3 | 4 | - | - |
| Support type | Nafion® NR212 | Nafion® NR212 | - | - |
| Anion exchange capacity (mmolg$^{-1}$) | 0.10 | 0.17 | 0 | 2.90 |
| Cation exchange capacity (mmolg$^{-1}$) | 0.46 | 0.37 | 0.94 | 0 |
| Net vanadium flux (μmol h$^{-1}$ cm$^{-2}$) at 40 mA cm$^{-2}$ (-, + indicate the direction towards the negative and positive side, respectively) | 3.2 | -4.8 | 7.5 | -9 |
| Capacity fading after 10h of operation at 160 mA cm$^{-2}$ (%/10h)h) | 10 | 3 | 46 | - |
| Area resistance in 1.6 M vanadium electrolyte at ~50% SOC (Ω·cm$^2$) | 0.71 | 0.65 | 0.45 | 0.98 |
| Round-Trip efficiency at 40 mA cm$^{-2}$ | 89 | 82 | 78 | 83 |
| Round-Trip efficiency at 120 mA cm$^{-2}$ | 74 | 65 | 72 | 73 |
| Round-Trip efficiency at 200 mA cm$^{-2}$ | 61 | 55 | 65 | 55 |

BILAYER ELECTROLYTE MEMBRANE AND A REDOX FLOW BATTERY COMPRISING A BILAYER ELECTROLYTE MEMBRANE

BACKGROUND OF THE INVENTION

Field of the Invention

The present invention describes an improved electrolyte bilayer membrane, in particular for electrochemical cells, such as redox flow batteries (RFBs), and a method for generating a bilayer membrane.

Redox flow batteries comprise two electrolyte solutions on the positive and negative electrode, separated by an ion exchange membrane. The electrolyte solutions contain redox couples, typically charged species (ions), which allows the storage of electrical energy (during charging) and the generation of electrical energy (during discharge). The ion exchange membrane is required to allow the passage of desired ions and prevent the passage for ions involved in the energy storage (redox-active species) as well as solvent. The transport of ions across the membrane within one charge-discharge cycle must be balanced between the negative and the positive electrolyte in order to prevent accumulation of redox-active species and/or solvent at one side (electrolyte imbalances) which would result in capacity fading. Moreover, the membrane ought to be of low cost, mechanically robust, and stable in the respective chemical environment.

Redox flow batteries, originally developed in the 1970s, are being considered as stationary energy storage devices in the context of smoothing the increasing share of intermittent renewable energy production. Therefore, they are implemented in various capacity levels, ranging from small units designed for frequency regulation up to units installed for peak-shaving and grid stabilization. The general assets of redox flow cells are high energy conversion efficiency, flexible design, high energy storage capacity, flexible location, deep discharge capability, high life-time and low maintenance cost compared with other energy storage technologies.

A redox flow battery uses two soluble redox couples as electroactive materials to store energy via oxidation and reduction reactions. In a typical set-up, the redox flow battery consists of two electrolyte reservoirs from which the electrolytes are circulated by pumps through an electrochemical reactor, consisting of a cell stack comprising a number of cells connected in series or parallel to enable reaction taking place at inert electrodes as shown in FIG. 1A.

FIG. 1A shows schematically a representation of a redox flow battery (RFB), comprising an ion-exchange polymer as electrolyte membrane. Typically, each cell comprises of negative electrode, positive electrode and an ion exchange membrane separator to allow diffusion of ions across the membrane while preventing the cross-mixing of the electrolyte solutions from these two reservoirs. The electrolytes contain redox-active species which can change their oxidation state reversibly upon charge and discharge. These active species are commonly multivalent ionic species, such as transition metal ions. The type of redox couple used in the electrolyte and the concentration of the species in their different respective oxidation states determine the electrochemical potential on the particular electrode.

The potential difference between the negative and positive electrode, which is achieved by choice of different redox couples on the two sides, determines the electromotive force or voltage of the cell. The voltage of the cell is therefore specific to the chemical species involved in the reactions. The general reactions can be written as:

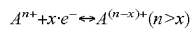

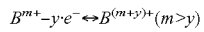

for the negative and positive electrode, respectively, where charge=→ and discharge=←. Examples of flow battery chemistries are the iron/chromium cell with $Cr^{2+}/Cr^{3+}$ ($E°=-0.41$ V vs. SHE) on the negative electrode and $Fe^{2+}/Fe^{3+}$ on the positive electrode ($E°=0.77$ V vs. SHE), the bromine/polysulfide cell with $S_2^{2-}/S_4^{2-}$ ($E°=-0.27$ V vs. SHE) on the negative electrode and $Br^-/Br_3^-$ on the positive electrode ($E°=1.09$ V vs. SHE), and the all-vanadium cell with $V^{2+}/V^{3+}$ ($E°=-0.26$ V vs. SHE) on the negative electrode and $VO^{2+}/VO_2^+$ on the positive electrode ($E°=1.00$ V vs. SHE).

The energy capacity of the redox flow battery is fully independent of its power, because the energy available is related to the electrolyte volume (amount of liquid electrolyte) and the power to the surface area of the electrodes.

In addition, the flow battery unit includes balance-of-plant components, such as pumps, tubing, power electronics, etc., to constitute an independent system. The repetitive unit of the stack of cells is made up of a polymer electrolyte, typically a cation or anion exchange membrane, which is sandwiched between flow field plates, through which the electrolyte solutions are pumped. As electrodes, porous carbon fibre structures are used.

The primary function of the electrolyte membrane is to provide pathways for ion conduction to ensure charge balance between positive and negative electrode. However, the passage of redox-active species, such as the transition metal ions, is not desired, as this leads to a cross-contamination of the electrolytes and a decrease in faradaic efficiency of the cell. Furthermore, if the passage of redox-active species with one charge-discharge cycle is unbalanced between the positive and the negative side, capacity fading is observed. The positive and negative electrolytes contain a common ion, for instance through the presence of supporting electrolyte, whose transport through the electrolyte is desired to ensure charge balance. Typically, the electrolytes used are aqueous solutions of redox couples, for instance $V^{3+}/V^{4+}$ and $VO^{2+}/VO_2^+$ (see above), and a strong acid, such as sulfuric acid, hydrochloric acid, methanesulfonic acid, etc., or combinations thereof, is used as a background electrolyte. In this case, the membrane should allow the passage of the ions of the supporting electrolyte, for example of $H^+$ or (bi)sulfate anions (either cation or anion exchange membrane), and prevent the crossover of vanadium species.

As electrolyte membrane, typically dense ion exchange membranes are used, which could be cation exchange membranes, anion exchange membranes or a combination thereof (amphoteric ion exchange membranes).

SUMMARY OF THE INVENTION

The present invention therefore has the objectives to provide an electrolyte membrane and a method for generating such an electrolyte membrane wherein the resistance of the electrolyte membrane should be as low as possible to minimize ohmic losses. Concurrently, the electrolyte membrane should have a low permeability for the redox-active species. If redox-active species are still crossing the electrolyte membrane, this transport should be balanced during charge and discharge in order to prevent a net vanadium flux and the associated capacity fading. Moreover, the electrolyte membrane should be mechanically robust, chemically stable in the respective electrolyte solution, and be of low cost.

The present invention describes a membrane to be used as a separator and polymer electrolyte in a redox flow battery (RFB), for instance an all-vanadium redox flow battery (VRFB). A membrane for a flow battery ought to be designed to meet the following requirements concurrently:
1. Low ohmic resistance: to minimize resistive losses during charging and discharging, the resistance $R_\Omega$ of the membrane needs to be as low as possible. Since the ohmic resistance is given by $$R_\Omega = \frac{\delta}{\sigma}$$

where $\delta$ is the thickness of the membrane and $\sigma$ its conductivity, it can be minimized either by reducing the thickness $\delta$ of the membrane or maximizing the conductivity $\sigma$. For a monolithic membrane material, a thickness of at least 30 µm is recommended and usually used in redox-flow batteries for reasons of mechanical robustness. In this invention an alternative membrane is prepared comprising a thin ion-conducting layer with a thickness below 15 µm which is supported with another material for mechanical robustness.
2. Barrier for redox-active species and solvent molecules: the membrane should present an effective barrier for the redox active species, which are typically transition metal cations, e.g., vanadium-ions, to maximize faradaic efficiency. This means that the membrane should be highly selective towards the transport of background electrolyte ions, such as protons and bisulfate, and block the passage of redox active ions. Furthermore, the transfer of solvent during the operation of the cell/battery should be as low as possible to minimize volume imbalance effects.
3. Since a complete blockage of the transfer of redox-active species is unrealistic, the membrane should display balanced transport properties of the different redox active species to prevent capacity fading due to depletion of redox-active species in the negative or positive electrolyte. This means that the transport of ions across the membrane should be as symmetric as possible during charging and discharging to avoid accumulation/depletion of the redox-active species in the two electrolytes.

These objectives are achieved according to the present invention by a bilayer ion exchange membrane for use in electrochemical cells, such as primarily in redox flow batteries, specifically in vanadium redox flow batteries, comprising:
a) an ion exchange polymer layer including N-heterocycles with electron lone pairs acting as proton acceptor sites;
b) a mechanically robust polymer substrate as support layer; and
c) the ion exchange polymer layer with proton acceptor sites attached to the support layer by solution-coating or spray-coating.

Preferred embodiments of the present invention regarding the bilayer ion exchange membrane are listed in the dependent.

With respect to the method, these objectives are achieved by a method for generating a membrane, preferably a bilayer membrane according to the invention, wherein the polybenzimidazole class polymer is dissolved in a suitable solvent, e.g. dimethylacetamide (DMAC), to form a polymer solution at a polymer concentration between 0.5 and 35 wt-% and:

a) cast onto a flat substrate, e.g., a glass plate, followed by drying and curing of the film, release of the film from the substrate and hot-pressing it together with the support layer to form the bilayer membrane, or
b) cast onto the support layer, followed by drying and curing of the film to form the bilayer membrane; or
c) sprayed onto the support layer, followed by drying and curing of the film to form the bilayer membrane.

Preferred embodiments regarding the method are given in the remaining claims.

The present invention describes a family of ion exchange membranes comprising a bilayer architecture to achieve these requirements. The bilayer membrane comprises two polymers, i) a polymer comprising N-heterocycles with electron lone pairs acting as proton acceptor sites and ii) a mechanically robust polymer that acts as a support, which can be a dense cation exchange membrane or a porous support layer as shown in FIG. 2. This bilayer architecture allows the use of a very thin (<15 µm) polymer film on a supporting polymer to minimize the ohmic (ionic) resistance and tune the electrolyte transport properties of the membrane.

FIG. 11 depicts the area specific resistance (ASR) of different bilayer membranes included in this invention disclosed here (examples 1-5) compared to the state-of-art materials Nafion® NR212 (comparative example 1) and FAP-450 (comparative example 2). The membrane must provide an area resistance below 1 $\Omega cm^{-2}$ to be suitable for a broad range of current densities in the redox flow battery. The combination of the two polymers in the bilayer yields a membrane with properties superior to those of the individual films. The thin polymer layers alone would not be sufficiently robust to constitute a self-standing membrane for use in a redox flow battery. The thick supporting polymer alone displays excessive electrolyte transfer, leading to significant imbalance effects and rapid fading of the capacity of the battery.

The polymer comprising proton acceptor sites is a polymer that contains N-heteroaromatic units with lone pair electrons, which have base character and accept protons from the supporting acidic electrolyte. The protonated polymer thus carries fixed positive charge and presents an anion exchange polymer. The heterocyclic units in the polymer may be imidazole, benzimidazole, benzobisimidazole, or pyridine units, which are an integral part of the polymer main chain or are attached to the main chain as pendant groups. One class of polymers containing N-heterocycles are polybenzimidazoles (PBIs). PBI type polymers contain in their repeating unit the benzimidazole motif. There is a wide variety of polymers based on benzimidazole, such as poly(2,2'-m-phenylene-5,5'-bibenzimidazole) (meta-PBI), poly(2,2'-p-phenylene-5,5'-bibenzimidazole) (para-PBI), poly(2,5-benzimidazole) (AB-PBI), poly(p-phenylene benzobisimidazole) (PBDI), and poly-2,2-(X,Y-pyridine)-5,5'-bibenzimidazole (P-PBI) where (X,Y) indicates the possible substituent pattern: (2,5), (3,5), (2,6) or (2,4). Some of these polymers are commercially available. Another polymer that is commercially available is poly-[(1-(4,4'-diphenylether)-5-oxybenzimidazole)-benzimidazole] (PBI-OO) by fumatech GmbH (Bietigheim-Bissingen, Germany) (FIG. 3). Other N-heterocycles are pyridine or imidazole units (FIG. 4) where the nitrogen sites can be protonated or functionalized. Pyridine may be part of the main chain of a polyarylene polymer, such as in the TPS polymer from Advent Technologies (Cambridge, Mass., USA), or attached to a polymer as pendant group or part of a pendant group. Imidazole units, in addition to being part of the polymer main chain as in the PBI type polymers, may be attached to a polymer as a pendant group or part of a pendant group.

The polymers containing imidazole or benzimidazole units can be modified at one of the nitrogen-atoms ($N^1$) of the heterocycle where a second nitrogen-Atom ($N^2$) is intrinsically forming positive charges in the acidic battery electrolyte which contributes substantially to introduce additional ionic charges and to improve the ionic conductivity and ion selectivity. Examples are anion exchange groups or cation exchange groups. Additionally, the nitrogen of the imidazolium-units can be functionalized at $N^1$ or $N^2$ with crosslinkers of any kind.

The imidazolium unit in the polymer chains can also be functionalized with ion-exchange groups and their precursors and crosslinkers at the same time. Some examples described form well-dispersed polymers. In other examples, it is beneficial to introduce the ionic and cation ion-exchange moieties by post-modification of the deposited nitrogen-containing polymer film. Crosslinking with crosslinkers, such as dihaloalkanes, e.g., dibromodecane, is preferably performed after the deposition (casting, coating or spraying) of the PBI films.

FIG. 5 illustrates the possible alkylation performed on a benzimidazole unit. The modification of the benzimidazole unit is carried by a deprotonation with lithium hydride or another strong base followed by the reaction with an R—X compound, where X is a halogen, such as bromine, chlorine, iodine, or any type of esterAlkyl-sulfonic acid groups can be also introduced by the reaction of the imidazole unit with a cyclic ester. Examples are 1,3-propane sultone or 1,4-butane-sultone but not limited to those.

The type of alkylation reagents encompasses a vast range of functionalities.

FIG. 6 shows a non-exhaustive list of possible alkylation reagents. The reagents can contain a terminal ionic group, which will function as an ion exchange site in the membrane and improve ion conductivity. Anionic head groups can be obtained from sulfonic acids —$SO_3H$, sulfonic acid salts, such as sodium sulfonate, —$SO_3^-$... $Na^+$, or sulfonic acid esters —$SO_2$—OR after hydrolysis. A corresponding alkylation reagent can be Br—R—$SO_3^-$, Br—$R_f$—$SO_3^-$, where R and $R_f$ are alkyl or (per)fluoroalkyl groups, an example being Br—$(CH_2)_2$—$SO_3^-$. Other alkylation reagents include phosphonic acids —P(=O)(OH)$_2$, or phosphonic acid esters —P(=O)(OR$_1$)(OR$_2$). Here, as an example, the phosphonate ester Br—$CF_2$—P(=O)(OEt)$_2$ is highlighted, which after hydrolysis yields the pendant chain —$CF_2$—P(=O)(OH)$_2$. Again, a more general family of compounds would be X—R,$R_f$—P(=O)(OR$_1$)(OR$_2$). Cationic head groups can be quaternary ammonium, —$N^+R_1R_2R_3$, where the $R_i$ groups are alkyl chains, such as methyl, ethyl, propyl, butyl, etc., e.g. —$N^+(Me)_3$. The corresponding R—X compound is Br—R,$R_f$—$N^+R_1R_2R_3$, e.g., Br—$(CH_2)_2$—$N^+(CH_3)_3$. Furthermore, alkylhalides, such as Br—R,$R_f$—$CH_3$, e.g., Br—$(CH_2)_9$—$CH_3$, can be used to introduce an alkyl pedant chain with defined length. Haloalkanes with two halo atoms on either end, Br—R,$R_f$—$CH_3$, e.g., Br—$(CH_2)_{10}$—Br, can be used to crosslink the polymer to prevent dissolution.

The supporting polymer provides mechanical robustness to the bilayer electrolyte membrane. In one embodiment (cf. FIG. 2a), the supporting polymer is a dense cation exchange membrane, preferably a sulfonic acid type material. An example is the perfluoroalkylsulfonic acid (PFSA) materials class, which are commercially available under the trade names Nafion® (Chemours), Flemion® (Asahi Glass), Aciplex® (Asahi Kasei), or Aquivion® (Solvay). Other examples are sulfonated polymers of the polyarylene class, such as sulfonated poly(ether ketones), polysulfones, polyphenylenes, etc.

When PFSA membranes are used as mechanically robust supporting layer, the thickness of the PFSA membrane can be considerably reduced compared to PFSA membranes which are usually used in redox flow batteries. The thickness of the PFSA membranes is therefore in the examples preferably below 125 μm, and often a thickness 60 μm is preferred.

The reduction of the PFSA thickness improves the ionic conductivity of the membranes and lowers the cost of the battery-membrane. PFSA membranes are preferred materials, as they have excellent stability in redox flow battery electrolytes, such as solutions of vanadium-ions in the oxidation states II, III, IV and V in dilute aqueous sulfuric acid, and high conductivity. However, their barrier property against the transfer of vanadium-ions is poor, as shown in numerous studies reported in the literature.

In case of the use of an unmodified polymer with proton accepting N-heterocycles and a PFSA membrane with given thickness as support, the ratio of cation exchange capacity, given by the thickness and equivalent weight of the PFSA membrane, to anion exchange capacity, given by the thickness of the proton accepting polymer and its density of N-heterocycles, which yields anion exchange sites upon protonation, can be conveniently tuned in this type of bilayer membrane via the thickness of the two constituent polymer layers. Thus, the transport properties of the membrane, i.e., the net flux of vanadium ions across the membrane, can be adjusted.

Another class of supporting polymers are partially fluorinated membranes prepared via radiation grafting from fluorinated or partially fluorinated films, such as FEP, PFA, PVDF, ECTFE or ETFE, containing sulfonated styrenic moieties, or any other polymer functionalized with a cation exchange group. For sufficient mechanical robustness, the thickness may be chosen to be preferably more than 15 μm.

In a second embodiment of the present invention, the supporting polymer is a porous substrate. This substrate may be a polymer without any ion-exchange functionalities, such as a microporous nonwoven polyolefin (polyethylene or polypropylene), commonly used as battery separator.

Examples of such materials are Celgard® (Celgard, USA), Treopore® (Treofan, Germany), and Solupor® (Lydall Performance Materials, The Netherlands). The preferred thickness of the microporous substrate is in the range of 15 to 50 μm, preferably 20 μm, 25 μm, 30 μm or more, to ensure sufficient mechanical robustness of the final bilayer membrane. In same examples, the polyolefinic separator may be more than 10 μm to provide sufficient mechanical robustness. Preferably, the microporous substrate has a porosity of more than 40% to ensure a high uptake of the electrolyte. Due to the high porosity of the separator-type supporting-layer the ohmic resistance is greatly lowered, at the same time, the vanadium crossover is limited by the thin PBI-layer yielding to a highly selective membrane and significant improvements in the round-trip efficiency of the vanadium flow battery at current densities within <120 mA $cm^{-2}$ (FIG. 10).

The pore size of the material influences the coating behavior and/or final structure of the ion exchange polymer it is combined with in the bilayer membrane. In order to ensure a smooth coating, the average pore size of the porous substrate is preferably below 1 μm but greater than 5 nm.

In a further embodiment, the microporous substrate, which is combined with the thin ion exchange polymer to form the bilayer membrane, can be modified to improve the wetting properties or the adhesion of the ion exchange polymer. Suitable functional groups are those which form weak or strong non-covalent bonds with the ion exchange polymer. This may be a proton donor or proton acceptor group.

These groups are preferably introduced into the microporous substrate by plasma-, corona discharge- or electron-induced graft-polymerization with suitable monomers. Examples of monomers that modify the surface of polyolefines to increase hydrophilicity are acrylic monomers, such as methyl acrylate (MA), methyl methacrylate (MMA), hydroxyethyl methacrylate (HEMA), glycidylmethacrylate (GMA), acrylic acid (AAc), acrylamide (Am), methacrylamide (MAm), acrylonitrile (AN), or methacrylonitrile (MAN). Other examples of monomers are vinylacetate (VAc), N-vinylformamide (NVF), and N-vinylpyrrolidone (NVP). Some of these monomers can undergo post-treatment, such as hydrolysis, to further improve wettability. Other monomers are acids to improve wettability and promote ionic crosslinking to the polymer comprising N-heterocycles. Monomers bearing acid groups are vinylsulfonic acid, styrene sulfonic acid, and vinylphosphonic acid. Alternatively, the monomers carry proton acceptor groups, such as 2- or 4-vinylpyridine or 1-vinylimidazole.

Another method to improve the adhesion between the microporous olefinic supporting films to the polar nitrogen-containing layers is to pretreat the olefinic microporous film by an ozone- or corona process to increase the surface energy of the polymer by at least $0.25$ mN/m$^{-2}$ but not more than $8.5$ mN/m$^{-2}$. Moreover, the solution-based deposition of the nitrogen-containing imidazolium-polymers such as PBI is improved when using simplified pretreatment due to an improved homogenous dispersion of the nitrogen-containing polymer onto the ozone or corona treated polyolefine-substrate.

The bilayer membrane is generally formed by combining the supporting polymer with the thin nitrogen-containing ion exchange polymer. Various methods can be used to accomplish this:

1. Solution casting: the polymer containing heteroaromatic units is dissolved in a suitable solvent. Such solvents are typically polar, non-aqueous high-boiling point solvents, such as dimethylsulfoxide (DMSO), dimethylformamide (DMF), dimethylacetamide (DMAC), or N-methylpyrrolidone (NMP). The polymer content of the solution is preferably between 5 and 15% by weight. The polymer solution is cast by known procedures, e.g. using a doctor blade for a small scale process, or a roll casting apparatus for a large scale process. The casting is performed either onto a carrier sheet or directly onto the microporous polymer substrate. Subsequently, the cast polymer is dried, e.g. at 100° C., and then cured, e.g. at 150° C. In case of coating of a carrier sheet, the polymer film is then released from the carrier and hot-pressed together with the microporous polymer substrate to obtain the bilayer membrane.
2. Spraying: a solution of the polymer and a suitable solvent is formed as indicated above, yet at a lower content of the polymer, preferably between 0.5 and 5%. The polymer solution is sprayed onto the microporous polymer substrate using spray-coating methods, followed by drying of the polymer and curing. In this way, a mechanically robust membrane is formed without the need of a hot-pressing stage.

The polymer may undergo post-treatment after film formation has been accomplished, before or after the curing stage. The purpose of such post-treatment is to modify functional groups contained within the polymer, such as release of protecting groups. For example, sulfonate or phosphonate ester groups, introduced via an alkylation reaction described above, can be hydrolyzed to form the parent acid, i.e., sulfonic or phosphonic acid, followed by rinsing to remove reaction products.

For the film formation using a polymer solution described above, two or more polymers may be mixed before the process of film formation, leading to the formation of a polymer blend. For example, a pristine, i.e., unmodified, polymer may be combined with a polymer that has undergone functionalization by an alkylation reaction, e.g., to introduce acid groups. The co-deposition of the two polymers may yield a favorable combination of properties of the two individual polymers.

The new bilayer-membranes described in this invention are suitable as a polymer electrolyte and separator in a redox flow battery. Typically, the supporting electrolyte in the most widely implemented flow battery types, such as the iron-chromium redox flow battery, all-vanadium redox flow battery, zinc-bromine redox flow battery, or the hydrogen-bromine redox flow battery, is a aqueous solution of a mineral acid, such as sulfuric acid, hydrochloric acid, methane sulfonic acid, etc., or combinations thereof. Therefore, the proton acceptor sites, preferably N-heteroaromatic units, in the bilayer membrane are protonated, thereby introducing permanent positive charges (cf. FIG. 7). If the polymer contains functional acid groups, e.g. sulfonic acid or phosphonic acid groups which can be introduced by an alkylation reaction and potentially subsequent steps, the protonation of the N-heterocycles is performed by the protons from the polymer-bound acid groups. Depending on the concentration of polymer-bound acid groups, further protonation is possible in the flow battery electrolyte. This yields an ion exchange polymer with amphoteric character, i.e., a polymer containing both fixed anionic and fixed cationic groups.

A superior redox flow battery is achieved according to the present invention by a redox flow battery comprising a bilayer membrane according to the invention disclosed herein. Preferred redox flow batteries can be achieved when the negative electrolyte solution comprises an aqueous solution of sulfuric acid as background electrolyte and $V^{2+}/V^{3+}$ as redox-active species, and wherein the positive electrolyte solution comprises an aqueous solution of sulfuric acid as background electrolyte and $VO^{2+}/VO_2^+$ as redox-active species (all-vanadium redox flow battery). The membrane as claimed by the present invention therefore has the advantage over the prior art that the membrane shows:
1.) High ion selectivity (high proton conductivity but concurrently low vanadium crossover)
2.) balanced ion transport and hence a lower net vanadium flux
3.) higher capacity retention than state-of-the-art commercial membranes.

Preferred examples of the present invention are discussed hereinafter in detail with reference to the attached drawings.

BRIEF DESCRIPTION OF THE SEVERAL VIEWS OF THE DRAWING

FIG. 1 Key properties of membranes for redox flow applications, consisting of the anion and cation exchange capacity, the net vanadium flux, the capacity fading rate, the ohmic resistance $R_\Omega$ in the vanadium redox flow cell and the round-trip efficiency at 40, 120 and 200 mA cm$^{-2}$;

DETAILED DESCRIPTION OF THE INVENTION

Examples

Figure 1A:
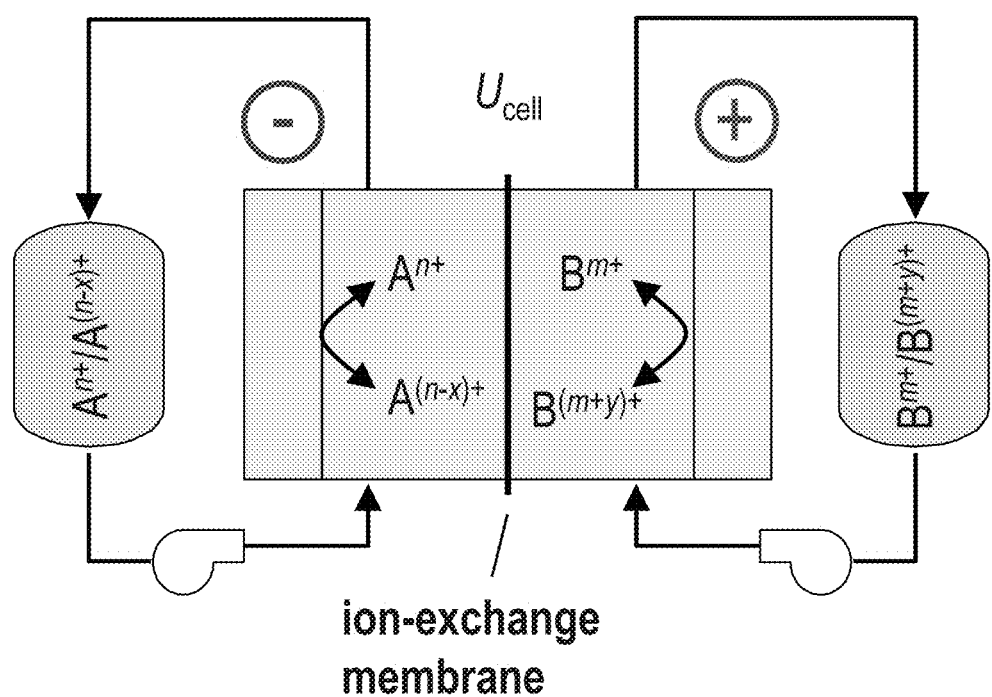
FIG. 1A a sketch of a state of the art redox flow battery (RFB), comprising an ion-exchange polymer as electrolyte membrane.
Figure 2:
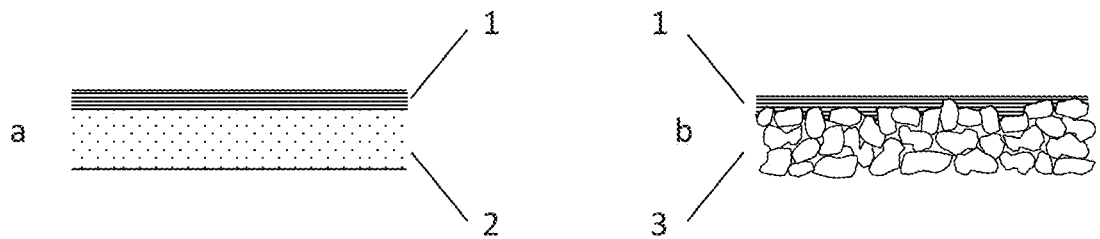
FIG. 2 a schematic of the bilayer membranes described in the present invention, comprising a thin (<15 μm) ion exchange polymer layer (1) and a polymeric support of >25 μm thickness; (a) bilayer membrane using a non-porous cation exchange membrane as support; (b) bilayer membrane using a porous non-ion-conducting layer as support.
Figure 3:
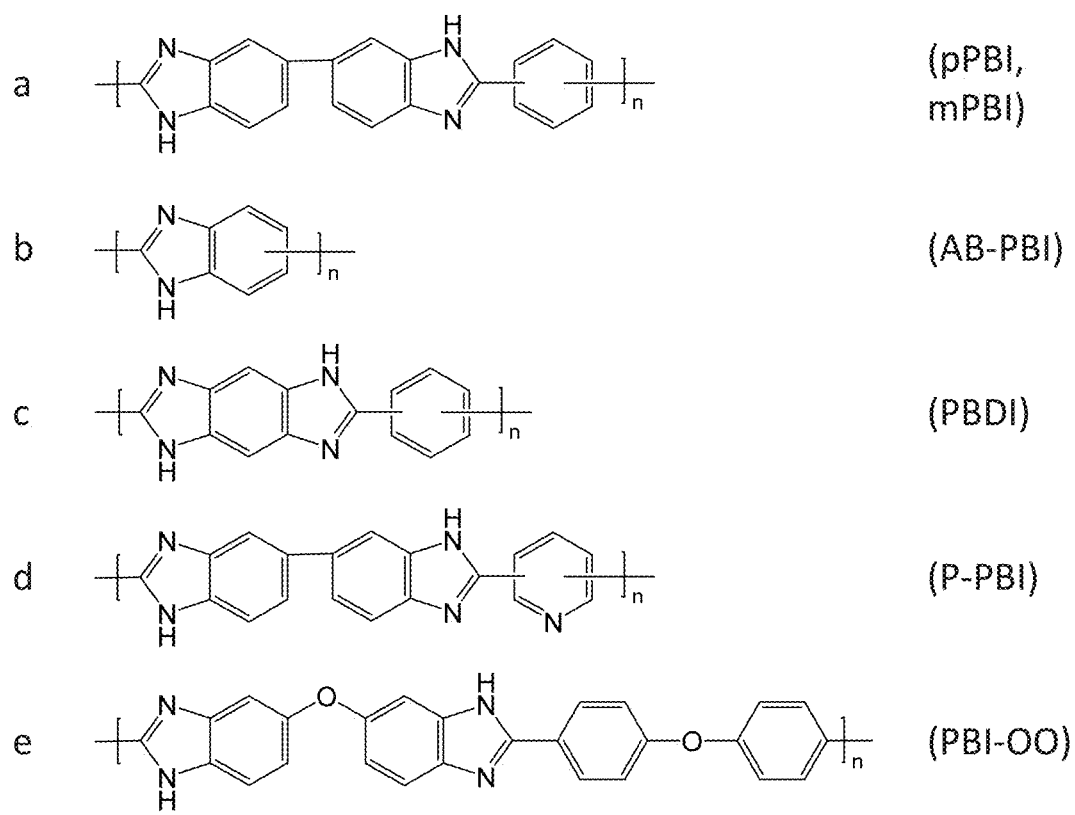
FIG. 3 a non-exhaustive list of polymers containing the benzimidazole motif which form anion exchange ionomers upon exposure to an acid.
Figure 4:
FIG. 4 pyridine and imidazole units contained in a polymer structure, presenting basic nitrogen atoms that are protonated in the presence of an acid.
Figure 5:
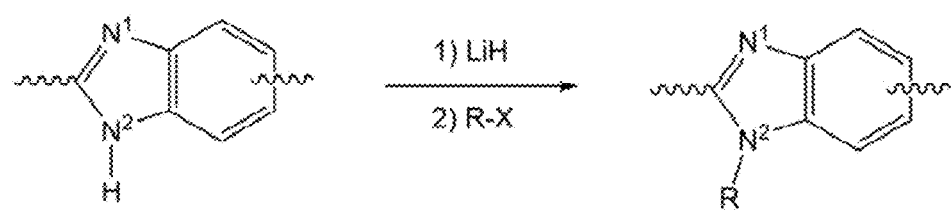
FIG. 5 schematically a functionalization of benzimidazole units in a polymer with the aim to introduce pendant groups R, which may comprise ion exchange groups, via the lithium hydride route.
Figure 6:
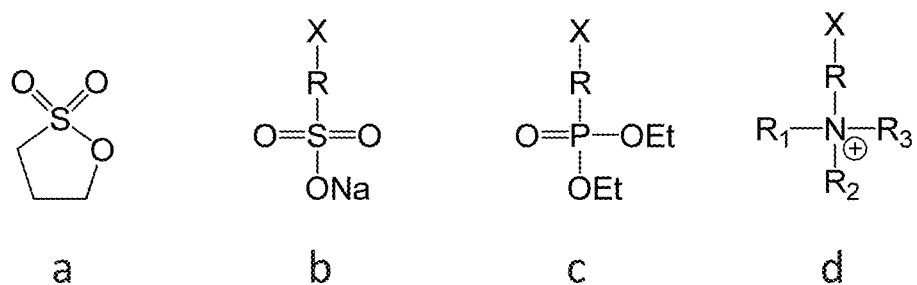
FIG. 6 a non-exhaustive list of alkylation agents to modify a polymer comprising imidazole or benzimidazole groups; (a) 1,3-propane sultone, (b) halo-alkyl sulfonates, (c) halo-alkyl phosphonic ester, (d) quaternary halo-alkyl ammonium salts.
Figure 7:
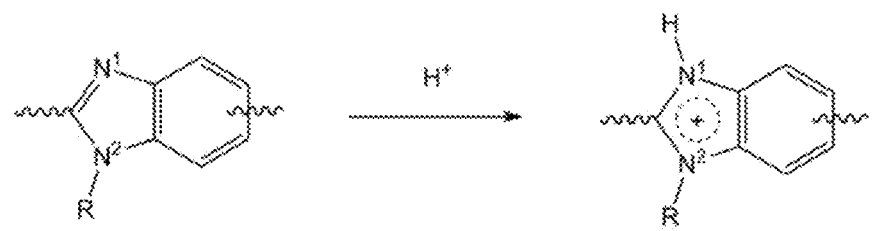
FIG. 7 schematically the protonation of an imidazole group in a polymer chain in the presence of an acid, yielding a benzimidazolium group, which acts as anion exchange group.

The following Examples and Comparative Examples are provided for the purpose of further illustrating the present invention but are in no way to be taken as limiting.

Example 1

A Nafion®/meta-polybenzimidazole (mPBI) bilayer membrane with a PBI-layer thickness of 3 μm was prepared by hot-pressing a PBI- and a Nafion® NR212-film onto each other at 80° C. for 3 min. Nafion® NR212 is used as received, the 3 μm PBI film is previously prepared by casting a 10 wt % solution of mPBI in dimethylacetamide onto a glass plate. The cast film was dried at 110° C. for 5 min, cured at 150° C. for 10 min and subsequently placed into a deionized water bath to remove the PBI-film from the glass plate.

Example 2

A Nafion®/meta-polybenzimidazole (mPBI) bilayer membrane with a PBI-layer thickness of 4 μm was prepared by hot-pressing a PBI- and a Nafion® NR212-film onto each other at 80° C. for 3 min. Nafion® NR212 was used as received, the 4 μm PBI film was previously prepared by casting a 10 wt % solution of mPBI in dimethylacetamide onto a glass plate. The cast film was dried at 110° C. for 5 min, cured at 150° C. for 10 min and subsequently placed into a deionized water bath to remove the PBI-film from the glass plate.

Example 3

A Treopore®/meta-polybenzimidazole (mPBI) bilayer membrane with a PBI-layer thickness of 3 μm was prepared by hot-pressing a PBI- and a 20 μm thick Treopore® PDA-film onto each other at 80° C. for 3 min. Treopore® PDA was used as received, the 3 μm PBI film was previously prepared by casting a 10 wt % solution of mPBI in dimethylacetamide onto a glass plate. The cast film was dried at 110° C. for 5 min and subsequently cured at 150° C. for 10 min.

Example 4

A Treopore®/meta-polybenzimidazole (mPBI) bilayer membrane with a PBI-layer thickness of 1 μm was prepared by spray-coating of a PBI solution in dimethylacetamide (1 w %) directly onto the Treopore® PDA-film (20 μm thickness). The coated film was dried at 110° C. for 5 min and subsequently cured at 150° C. for 10 min.

Example 5

To prepare a functionalized PBI-film, 1 mole equivalent of LiH was added to a 5 w % solution of mPBI in dimethylacetamide in Argon atmosphere. The mixture was stirred for 6 h at 90° C. until no more gas bubbles were observed (indicating the end of the deprotonation). Afterwards, 1 mole equivalent diethyl(bromodifluoromethyl) phosphonate is added to the solution and stirred for another 16 h at 90° C. The functionalized polymer solution was filtered and cast on a glass plate, dried at 110° C. for 5 min and subsequently cured at 150° C. for 10 min. The membrane was placed into 2 $H_2SO_4$ in order to hydrolyze the phosphonate ester.

Comparative Example 1

The cation exchange membrane Nafion® NR212 (Chemours) is used as Comparative Example 1. The membrane was pretreated by immersion in water or electrolyte depending on the performed analysis.

Comparative Example 2

The anion exchange membrane Fumasep® FAP-450 (fumatech) is used as Comparative Example 2. The membrane was pretreated by immersion in water or electrolyte depending on the performed analysis.

Membrane Characterization

The membranes were characterized for their key properties in the context of the application in redox flow batteries.

The ion exchange capacity was determined with titration. For that, all membranes were fully protonated in 2 M $H_2SO_4$ overnight and subsequently rinsed with water until a neutral pH was observed. Afterwards, the fully protonated membrane samples were immersed in 1 M KCl solution in order to exchange the acidic protons (corresponding to the sulfonic acid groups of NR212). The cation exchange capacity ($CEC^{exp}$) was determined from direct titration of the exchanged protons with 0.05 M KOH and calculated according to:

$$CEC^{exp}(\text{bilayer}) = \frac{c(\text{mmol } L^{-1}) \cdot F \cdot V(L)}{m_{dry}(g)}$$

where c, F, V and $m_{dry}$ are the concentration of KOH, the titration factor, the volume of KOH added at the equivalent point and the dry mass of the protonated membrane, respectively.

To determine the anion exchange capacity, the samples were removed from the KCl-solution and again rinsed with water until a neutral pH was observed. Titration was then performed indirectly by adding 2 mL KOH (0.05 mol $L^{-1}$) to the samples. After 2 h, this solution was titrated with 0.05 M HCl and the anion exchange capacity ($AEC^{exp}$) was calculated according to:

$$AEC^{exp}(\text{bilayer}) = \frac{[c^{KOH}(\text{mmol } L^{-1}) \cdot F^{KOH} \cdot V^{KOH}(L)] - [c^{HCl}(\text{mmol } L^{-1}) \cdot F^{HCl} \cdot V^{HCl}(L)]}{m_{dry}(g)}$$

including the concentration c, the titration factor F and the volume V of the titration solution.

The net flux of vanadium between the negative and the positive electrolyte was determined from the vanadium concentration and the volume of the fully discharged electrolyte over 50 cycles. For all measurements, the first 20 cycles were used for conditioning and neglected in the analysis. In this initial phase, the vanadium transport is superimposed by electrolyte flux resulting from an osmotic pressure gradient formed during the initial charging reaction (when using vanadium electrolyte of an average valence of 3.5 (~50% state of charge) a proton gradient evolves during the first charging that is not fully reversed during discharge). A negative flux represents transport towards the negative electrolyte. To measure the concentration, 300 μL samples were taken periodically over time once the applied potential was close to the lower termination voltage (0.8 V), corresponding to a state of charge of 0-5%. The sample was divided into 3 aliquots and a redox titration with $KMnO_4$ in 2 M $H_2SO_2$ was performed. The total volume of the electrolyte was constantly decreasing due to the continuous argon purging of the two electrolyte compartments. The net vanadium flux $J_V$ can be calculated using the vanadium concentration c μmol $L^{-1}$), the volume V (L), the operating time t (h) and the cell area $A_{cell}$ (cm$^2$):

$$J_V = \frac{[c_{pos} \cdot V_{pos}] - [c_{neg} \cdot V_{neg}]}{t \cdot A_{cell}}$$

To determine the rate of capacity fading due to imbalanced vanadium crossover, assembled cells were operated at a constant current density of 160 mA cm$^{-2}$ for 50 cycles (within termination voltages of 0.8 and 1.65 V). After each cycle, the discharge capacity was obtained from the discharge time at constant current.

The ohmic resistance of a redox flow cell is largely influenced by the conductivity of the membrane in the respective electrolyte solution(s). Therefore, the ohmic resistance was measured in an assembled all-vanadium redox flow cell at room temperature comprising carbon felt electrodes (SGL SIGRACELL® GFD4.6 EA) and the respective membrane as polymer electrolyte. A redox flow test system (Model 857) from Scribner Associates was used to operate the cell. Both the negative and the positive electrolyte compartment were filled with an aqueous solution containing commercially available (Oxkem, Reading, UK) 1.6 M vanadium sulfate solution (average oxidation state is 3.5) in 2 M $H_2SO_4$ and 0.05 M $H_3PO_4$. The ohmic area specific resistance $R_\Omega$ of the cell was determined in the uncharged state at open circuit potential from the intercept of the impedance spectrum in Nyquist representation with the real axis at the high frequency end.

Figure 8:
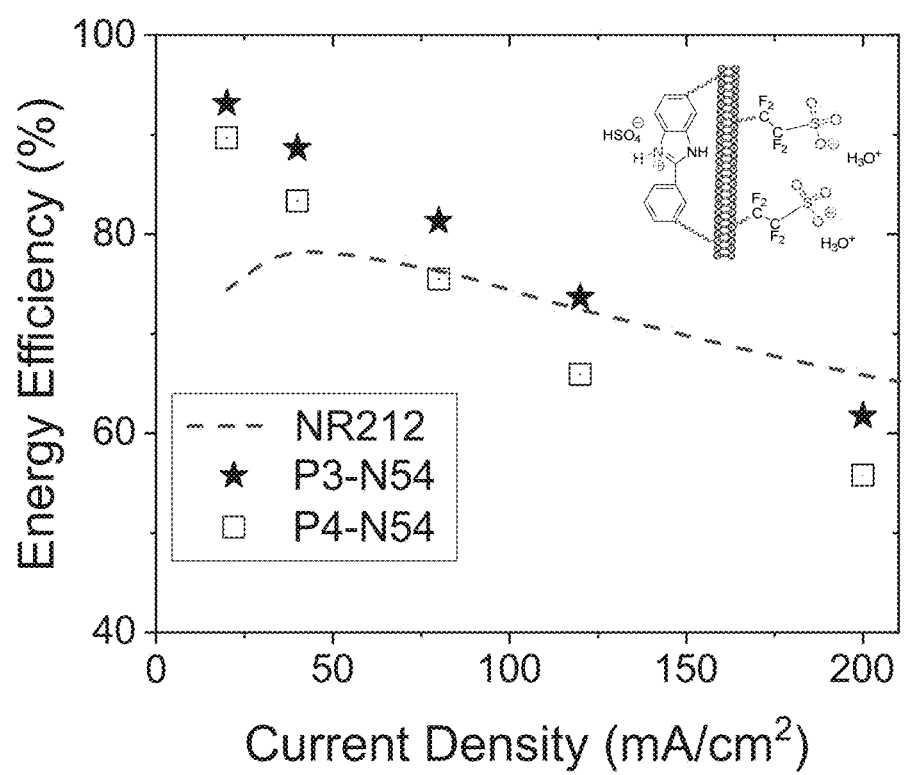
FIG. 8 shows the round-trip efficiency (energy efficiency) of a vanadium flow battery equipped with the bilayer membranes of the following Example 1, Example 2 and the comparative examples 1 and 2 over a usage range of 40-200 mA cm$^{-2}$.
Figure 9:
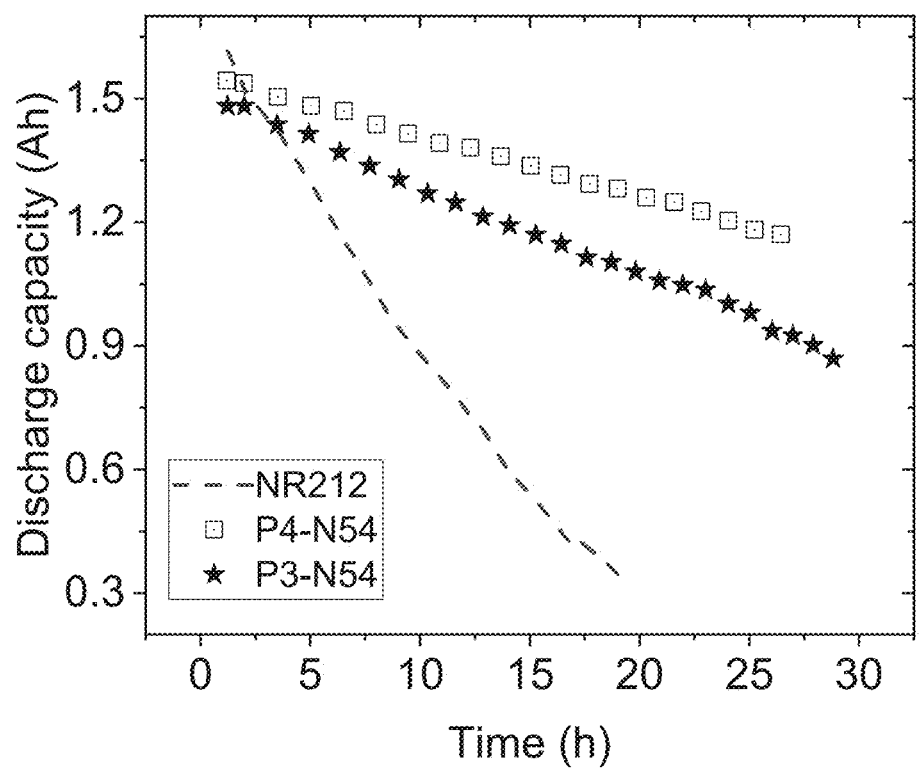
FIG. 9 shows the discharge capacity of a vanadium flow battery equipped with the bilayer membranes of Example 1 and Example 2 and the comparative example 1 at a current density of 160 mA cm$^{-2}$ over 50 charge discharge cycles.
Figure 10:
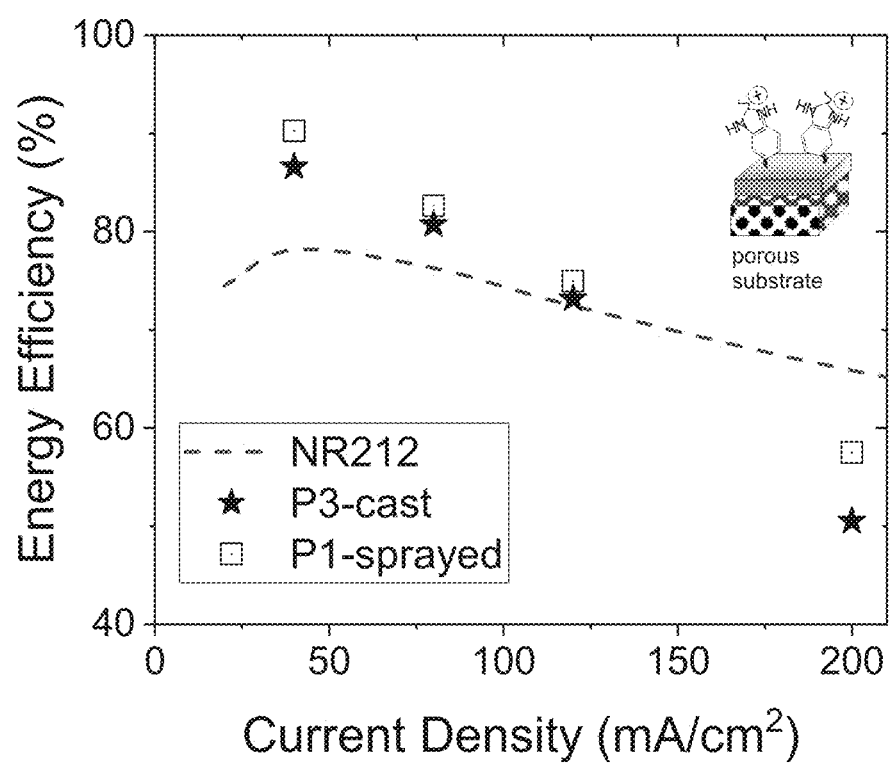
FIG. 10 shows the round-trip efficiency (energy efficiency) of a vanadium flow battery equipped with the bilayer membranes of Example 3 and Example 4 and the comparative examples 1 and 2 over a usage range of 40-200 mA cm$^{-2}$.

The description of the cell test results refer to Table 1 and the FIGS. 8 to 10.

The combination of a robust supporting layer with a low area resistance and a thin (<15 μm) PBI-layer improves the performance of vanadium flow batteries mainly by increasing the round-trip efficiency and by stabilizing capacity fading. The performance relevant characteristics of PFSA membranes coated with a thin PBI-layer are reported in Table 1. The moderate area resistance and concurrently reduced vanadium crossover yields an improved round-trip efficiency especially at current densities<120 mA cm-2 (FIG. 8). By balancing the ratio of anion and cation exchange capacity, the net vanadium flux was decreased to 30% reducing capacity fading by 93% for a PBI/Nafion® bilayer with a PBI thickness of 4 μm (at 160 mA cm-2). This stabilized capacity fading is further illustrated in FIG. 9.

When using a porous Treopore® PDA 30 film as a supporting layer in combination with a thin (<15 μm) PBI-layer that can either be hot-pressed or spray-coated onto the supporting layer, the round-trip efficiency of a vanadium flow battery was improved by up to 10% in the technical relevant range of current densities (40-120 mA cm-2) (FIG. 10).

Figure 11:
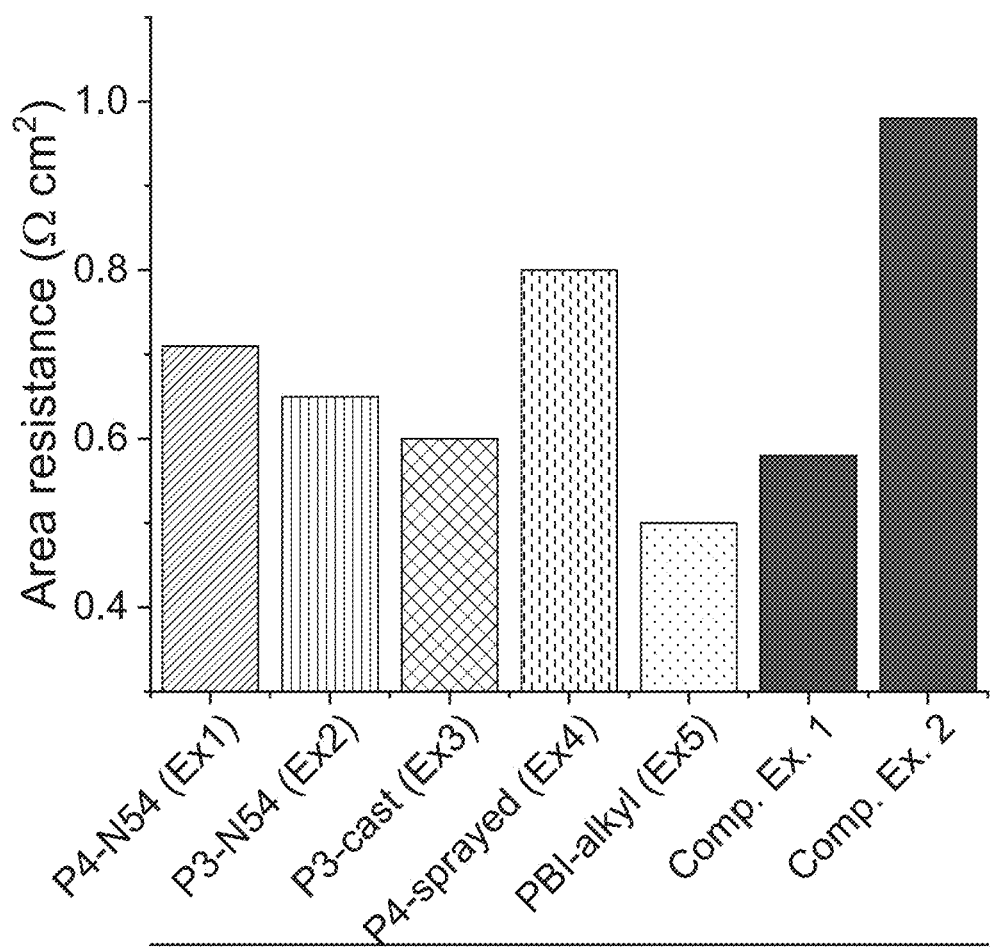
FIG. 11 shows the area resistance of a vanadium flow battery equipped with the bilayer membranes of Example 1-5 and of the Comparative Examples 1-2 in the fully discharged state.

To minimize voltaic efficiency losses, a low area resistance is favorable. All embodiments of the present invention have an area resistance that is lower compared to the benchmark membrane FAP-450 (Comparative Example 2). A further improvement of the area resistance of bilayered membranes comprising a supporting layer and a thin (<15 μm) PBI-layer is possible by introducing cation exchange groups into the PBI-layer. When attaching phosphonic acid groups to the imidazole-unit of a 12 μm PBI-layer (Example 5), the area resistance was reduced to 0.5 Ωcm2 (FIG. 11).

The invention claimed is:

1. A bilayer ion exchange membrane for use in electrochemical cells, the membrane comprising:
   a) an ion exchange polymer layer comprising N-heterocycles with electron lone pairs acting as proton acceptor sites;
   b) a mechanically robust polymer substrate as support layer;
   c) the ion exchange polymer layer with proton acceptor sites attached to the support layer by solution-coating or spray-coating;

d) the ion exchange polymer layer with proton acceptor sites is a polybenzimidazole-class polymer comprising one or more of the following compounds:

poly (2,2'-m-phenylene-5,5'-bibenzimidazole) (meta-PBI), poly (2,2'-p-phenylene-5,5'-bibenzimidazole) (para-PBI), poly (2,5'-p-benzimidazole) (AB-PBI), poly (p-phenylene benzobisimidazole) (PBDI), poly-2, 2-(X, Y-pyridine)-5,5'-bibenzimidazole (P-PBI) where (X,Y) is (2,5), (3,5), (2,6) or (2,4), and poly-[(1-(4,4'-diphenylether)-5-oxybenzimidazole)-benzimidazole] (PBI-OO); and e) the polybenzimidazole-class polymer is functionalized at the nitrogen-hydrogen (NH) site of the imidazole and/or benzimidazole and/or benzobisimidazole.

2. The membrane according to claim 1, wherein the polymer layer with proton acceptor sites consists of a polymer comprising at least 50 mol % of an imidazole and/or benzimidazole and/or benzobisimidazole unit.

3. The membrane according to claim 1, wherein the polymer layer with proton acceptor sites consists of a polymer comprising pyridine and/or imidazole units in a main chain or as pendant groups with a content of less than 50 mol %.

4. The membrane according to claim 1, wherein the functionalization includes deprotonation of the nitrogen-hydrogen NH site of the imidazole and/or benzimidazole and/or benzobisimidazole unit with an alkali hydride followed by alkylation with an R—X compound, wherein X is a halogen or a cyclic compound which opens upon reaction.

5. The membrane according to claim 4, wherein said R—X compound used for said functionalization yields one or more of the following:
a) crosslinking;
b) cation exchange functionalities;
c) protected acid groups or their alkali salts; and
d) anion exchange functionalities.

6. The membrane according to claim 1, wherein the polybenzimidazole-class layer has a thickness which is below 15 μm.

7. The membrane according to claim 1, wherein the support layer is a microporous polyolefin or a combination of microporous polyolefins.

8. The membrane according to claim 1, wherein the support layer is a dense cation exchange membrane containing sulfonate exchange sites ($-SO_{3-}$).

9. The membrane according to claim 8, wherein the cation exchange membrane is a perfluoroalkylsulfonic acid (PFSA) type membrane.

10. The membrane according to claim 8, wherein the cation exchange membrane is a partially fluorinated or non-fluorinated sulfonic acid type membrane or a radiation grafted membrane comprising styrene type sulfonic acid groups.

11. The membrane according to claim 1, wherein the proton accepting layer consists of a polybenzimidazole class polymer with a thickness of less than 15 μm and the support layer consists of a cation exchange membrane with a thickness between 15 and 150 μm.

12. The membrane according to claim 11, wherein the support layer is a microporous polyolefine modified at a surface of a film to improve the wettability of the material and/or increase adhesion with the proton accepting layer.

13. The membrane according to claim 12, wherein the modification of the microporous polyolefin support comprises a plasma-, corona discharge- or ionizing radiation-induced graft copolymerization introducing proton-donating- or accepting groups.

14. The membrane according to claim 12, wherein the surface of the microporous polyolefin support is ozone or corona treated or ionized with any radiation method and has a surface energy of at least 0.25 mN/m$^{-2}$ but not more than 8.5 mN/m$^{-2}$.

15. The membrane according to claim 11, wherein the proton accepting polymer consists of a polybenzimidazole class polymer with a thickness of less than 15 μm and the support layer consists of a microporous polymer.

16. A method for generating a membrane or a bilayer membrane according to claim 1, the method comprising the following steps:

dissolving a polybenzimidazole class polymer in a suitable solvent or dimethylacetamide (DMAC) to form a polymer solution at a polymer concentration between 0.5 and 35 wt-%; and:

a) casting onto a flat substrate or a glass plate followed by drying and curing of a film, release of said film from said substrate and hot-pressing it together with said support layer to form the bilayer membrane, or b) casting onto said support layer, followed by drying and curing of said film to form the bilayer membrane; or c) spraying onto said support layer, followed by drying and curing of said film to form the bilayer membrane.

17. The method according to claim 16, wherein said polymer solution includes a mixture of a pristine polybenzimidazole class polymer and a modified polybenzimidazole class polymer yielding a polymer blend after film formation.

18. A redox flow battery, comprising a membrane according to claim 1 forming a membrane electrolyte.

19. The redox flow battery according to claim 18, wherein the redox flow battery is a vanadium redox flow battery, and said proton accepting layer has a thickness determining an amount and a direction of a net vanadium flux across the bilayer membrane.

* * * * *